United States Patent
Coppola et al.

(10) Patent No.: US 9,914,657 B2
(45) Date of Patent: Mar. 13, 2018

(54) APPARATUS AND METHOD FOR THERMAL PROFILE CONTROL IN AN ISOPIPE

(71) Applicant: CORNING INCORPORATED, Corning, NY (US)

(72) Inventors: Frank Coppola, Horseheads, NY (US); Vladislav Yuryevich Golyatin, Avon (FR); John Jerry Kersting, Painted Post, NY (US); Bulent Kocatulum, Horseheads, NY (US); Monica Jo Mashewske, Horseheads, NY (US); Piotr Janusz Wesolowski, Painted Post, NY (US); Xi Xie, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/169,696

(22) Filed: Jan. 31, 2014

(65) Prior Publication Data

US 2014/0318182 A1    Oct. 30, 2014

Related U.S. Application Data

(60) Provisional application No. 61/817,423, filed on Apr. 30, 2013, provisional application No. 61/819,989, filed on May 6, 2013.

(51) Int. Cl.
*C03B 17/06* (2006.01)
*C03B 17/02* (2006.01)

(52) U.S. Cl.
CPC ............ *C03B 17/067* (2013.01); *C03B 17/02* (2013.01); *C03B 17/064* (2013.01)

(58) Field of Classification Search
CPC ....... C03B 29/08; C03B 29/025; C03B 17/02; C03B 17/04; C03B 17/061; C03B 17/064
See application file for complete search history.

(56) References Cited

U.S. PATENT DOCUMENTS

| | | | |
|---|---|---|---|
| 3,338,696 A | 8/1967 | Dockerty | 65/145 |
| 3,506,429 A | 4/1970 | Overman | 65/203 |
| 3,607,182 A * | 9/1971 | Leibowitz | 65/53 |
| 3,663,192 A * | 5/1972 | Perry | 65/492 |
| 4,214,886 A * | 7/1980 | Shay et al. | 65/121 |
| 6,786,634 B2 | 9/2004 | Hashimoto et al. | 374/127 |
| 7,748,236 B2 | 7/2010 | Pitbladdo | 65/193 |
| 8,007,913 B2 * | 8/2011 | Coppola et al. | 428/426 |

(Continued)

FOREIGN PATENT DOCUMENTS

| | | |
|---|---|---|
| CN | 202785965 | 3/2013 |
| CN | 202785968 | 3/2013 |

(Continued)

OTHER PUBLICATIONS

JP 2007-112665 machine translation as provided by http://dossier1.ipdl.inpit.go.jp/AIPN/odse_top_dn.ipdl?N0000=7400 on Mar. 3, 2015.*

(Continued)

*Primary Examiner* — Jodi C Franklin
(74) *Attorney, Agent, or Firm* — John L. Haack

(57) ABSTRACT

A glass fusion draw apparatus for molten glass stream thermal profile control, including:
  a first enclosure; and
  a first isopipe situated within the first enclosure,
the first enclosure can include at least one first heating element assembly integral with the wall of the first enclosure, and the at least one first heating element is in proximity to a portion of molten glass stream over-flowing the first isopipe within the enclosure. The apparatus can also include a proximity or temperature sensing system associated with the first enclosure that senses and controls the thermal gradient properties of the molten glass stream or streams in the first enclosure. Also disclosed are methods of making and using the fusion apparatus.

6 Claims, 6 Drawing Sheets

(56) References Cited

U.S. PATENT DOCUMENTS

| | | | |
|---|---|---|---|
| 8,037,716 B2 | 10/2011 | Aniolek et al. | |
| 8,490,432 B2 * | 7/2013 | Berkey et al. | 65/53 |
| 8,931,309 B2 * | 1/2015 | Abdul-Rahman et al. | 65/203 |
| 2002/0005404 A1 * | 1/2002 | Maeda et al. | 219/520 |
| 2006/0016219 A1 * | 1/2006 | Pitbladdo | 65/29.21 |
| 2008/0282736 A1 * | 11/2008 | Filippov et al. | 65/90 |
| 2011/0126587 A1 * | 6/2011 | Berkey et al. | 65/29.21 |
| 2013/0133370 A1 * | 5/2013 | Boratav et al. | 65/84 |
| 2014/0318182 A1 * | 10/2014 | Coppola et al. | 65/29.21 |
| 2016/0052818 A1 | 2/2016 | Golyatin et al. | |

FOREIGN PATENT DOCUMENTS

| | | | | |
|---|---|---|---|---|
| CN | 202785979 | | 3/2013 | |
| EP | 2253598 | | 11/2010 | |
| JP | 2003247785 A | * | 9/2003 | F27D 11/02 |
| JP | 2007112665 A | * | 5/2007 | |
| JP | 2007-112665 | | 5/2010 | |
| JP | 2011-225452 | | 11/2010 | |
| WO | WO 2005/110934 | | 11/2005 | |

OTHER PUBLICATIONS

Invitation to Pay Additional Fees and When Applicable, Protest Fee and Communication Relating to the Results of the Partial International Search—International Application No. PCT/US2014/035767, dated Apr. 29, 2014.

International Search Report of the International Searching Authority; PCT/US2014/035767; dated Sep. 25, 2014; 8 pages; European Patent Office.

* cited by examiner

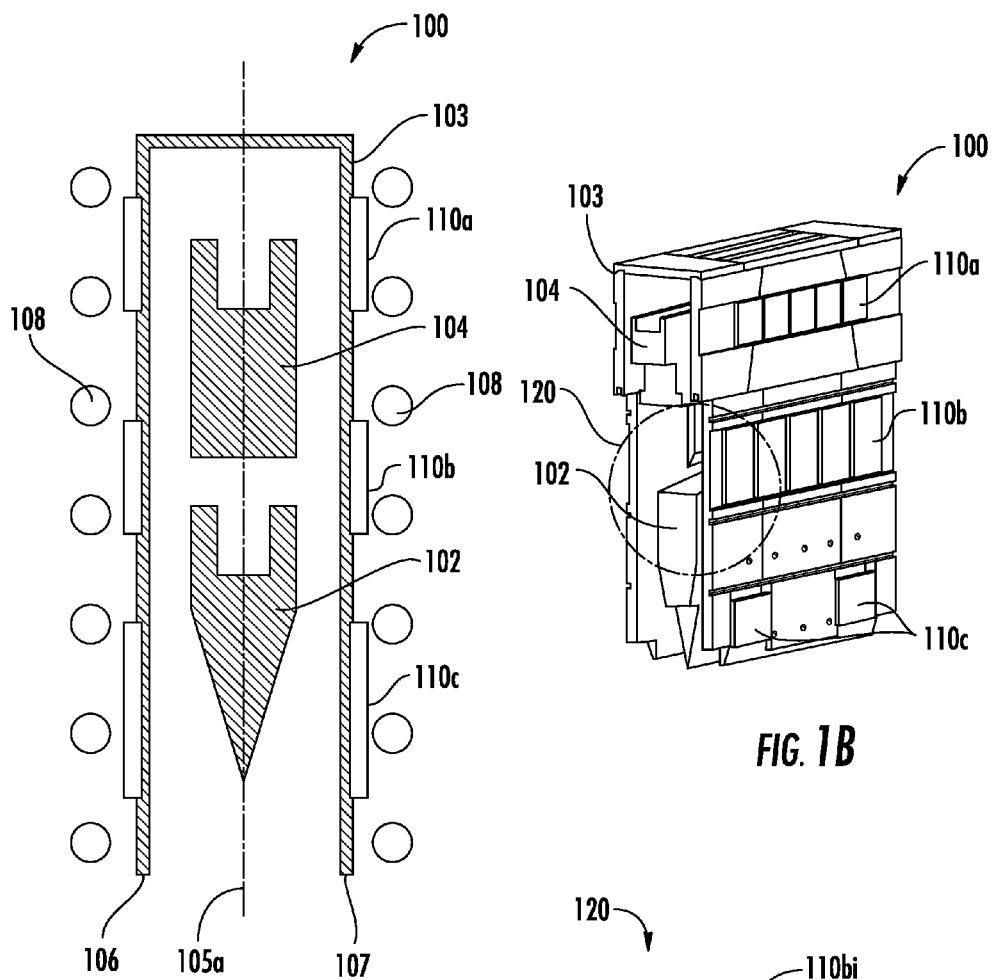
FIG. 1A
FIG. 1B
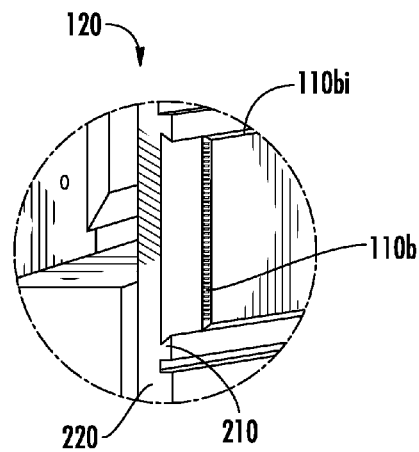
FIG. 2

APPARATUS AND METHOD FOR THERMAL PROFILE CONTROL IN AN ISOPIPE

CROSS REFERENCE TO RELATED APPLICATIONS

This application claims the benefit of priority under 35 U.S.C. § 119 to U.S. Provisional Application Ser. Nos. 61/817,423, filed Apr. 30, 2013 and 61/819,989, filed May 6, 2013, the content of which is relied upon and incorporated herein by reference in its entirety.

The entire disclosure of any publication or patent document mentioned herein is entirely incorporated by reference.

BACKGROUND

The disclosure relates to the manufacture of glass sheets in a fusion draw machine or a laminate fusion draw machine. More particularly, the disclosure relates to a method and apparatus for improved thermal control in the laminate fusion draw machine.

SUMMARY

The disclosure provides an apparatus and methods of use of the apparatus for the manufacture of glass sheets in a fusion draw machine or a laminate fusion draw machine.

In embodiments, the method and apparatus provide improved thermal control along the trough and at the root of an isopipe ("pipe"), which improved thermal control provides improved thickness and uniformity control, or controllable thickness variation, of the resulting drawn glass.

In embodiments, the present disclosure provides a fusion draw apparatus or a laminate fusion draw apparatus having a plurality of heating elements embedded in the walls of the enclosure (e.g., silicon carbide doghouse) at intervals laterally along, for example: on each side of the trough of an upper pipe; the root of a bottom pipe; the region or gap between the pipes; and like positions; or combinations thereof.

In embodiments, the apparatus and method provide improved control of the thermal profile and the thickness properties and uniformity of the clad, core, or both molten glass streams.

BRIEF DESCRIPTION OF THE DRAWINGS

FIGS. 1A and 1B show, respectively, an end view and a perspective view of exemplary resistive heater locations in a doghouse enclosure.

FIG. 2 shows the FIG. 1B inset (120) having dovetail grooves (210) to retain the winding assembly (110b) in the silicon carbide wall (220).

DETAILED DESCRIPTION

Figure 3:
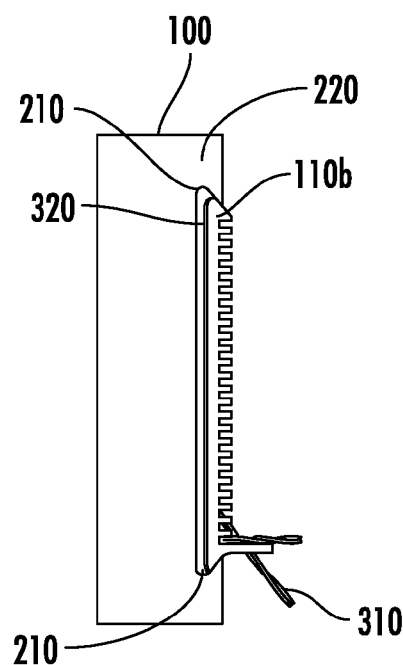
FIG. 3 shows an exemplary end view portion of a doghouse enclosure (100) wall (220) having resistive heater wire (e.g., platinum) windings (310) within the vias.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed apparatus and the disclosed method of making and using the apparatus provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Resistive heating," "resistive heater," and like terms such as Joule heating, ohmic heating, refers to the passage of an electric current through a conductor that results in the release of heat to the immediate surrounding(s).

"Globar®," "glowbar," and like terms refers to, for example, a silicon carbide rod of 5 to 10 mm width and 20 to 50 mm length, or alternatively, from 1.5 to 2.75 inches in diameter and heated lengths up to 164 inches, which can be electrically heated up to 1,000 to 1,650° C. (1,832 to 3,002° F.).

"Alundum" and like terms refers to, for example, a fused form of aluminum oxide.

"Isothermal" or "at or near an isothermal condition" refers to the following: if each of the inclined weirs (i.e., top lines) has an imaginary outward and planar projection, the planar projections intersect with the interior of the enclosure on opposite long sides and create an imaginary line on the inside surface and a corresponding imaginary line on the outside surface of the enclosure. In embodiments of the present disclosure, the temperature along each of these lines is preferably isothermal. The temperature value at clad weir elevation (top section) can, and in most instances will be, different from temperature at the core weir elevation (middle section). Accordingly, the entire enclosure may not be and need not be isothermal.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The apparatus and methods of the disclosure can include any value or any combination of the values, specific values, more specific values, and preferred values described herein, including explicit or implicit intermediate values and ranges.

In the fusion draw operation, distribution of glass over the top edges or weirs of an isopipe ("pipe") is a function of the pipe geometry and the temperature distribution along the length of the trough. Trough geometry is traditionally designed to operate in isothermal conditions. Consequently temperature non-uniformities can result in thickness deviations in the formed glass sheet. In a traditional fusion draw process (see for example, commonly owned and assigned U.S. Pat. No. 3,338,696, to Dockerty) such thickness deviations can be partially corrected at the root or lower tip of the pipe with, for example, localized heating using a Globar.

The temperature profile of the glass flowing over the isopipe inside an enclosure (e.g., a silicon carbide (SiC) "dog house") can be shaped by glowbars located outside the enclosure. A known globar layout provides relatively good capability for manipulating the vertical temperature profile, while its ability to affect temperature in the horizontal direction (e.g., along the trough such as left-to-center-to-right in an end view or end-to-center-to-end in a side view) is very limited. The traditional system (U.S. Pat. No. 3,338,696, to Dockerty) has been used to resolve horizontal thermal non-uniformities to a limited extent at the pipe root level by, for example, physically adjusting or tilting the isopipe.

In a multi-layer or laminate fusion process (e.g., 3 layers with a core layer and two outer clad glass layers), the traditional method of thickness deviation correction impacts only the bulk glass without discriminating the individual glass layers. In a multi-layer lamination, the thickness of each glass layer is preferably controlled to specified tolerances. Thus, an additional method to independently control the thickness properties or thickness profile each of the glass layers would be valuable. In embodiments, the present invention provides an apparatus and method that can supplement or be a substitute to the traditional method of thickness deviation correction.

In a three-layer lamination, the core glass can be sourced from a single isopipe where the glass flow on either side of the isopipe fuses or merges at the root of the isopipe to form a single homogenous interior glass layer. The clad glass can also be sourced from a single isopipe but the glass flow on each side of the clad isopipe is deposited on the outer surface of the core glass layer flowing over on respective sides of the core isopipe situated below the clad isopipe. The thermal profile at the confluence of the clad and core glasses is most likely not uniform or difficult to control due to the geometry between the two pipes. The viscosity of the respective glass streams in this region is preferably as uniform as possible to ensure a stable and uniform confluence. The same non-uniformity issue can be present in a multi-layer lamination such as when more than two pipes are stack-staged atop each other.

In embodiments, it is significant to achieve a particular temperature profile at the root of an isopipe where the glass(es) leave the isopipe surface and form a single or double ribbon. To ensure stable operation, avoid sheet width variation, avoid devitrification growth, and achieve the appropriate stress and shape of the ribbon, a certain horizontal temperature gradient is preferably maintained between the center of the isopipe and the respective ends of the isopipe. In traditional draw fusion, a profiled globar is primarily used to achieve the desired end-to-center or left-to-right temperature gradient.

In embodiments, the present disclosure provides an apparatus and method of use where the end-to-center power distribution to a plurality of modular resistive heating elements at or near the pipe root can be independently thermally manipulated. Such independent heating control is not possible with a profiled globar heating element or a globar array of the prior art.

In embodiments, the disclosure provides a glass fusion apparatus for molten glass stream thermal profile control, comprising:
 a first enclosure, e.g., a silicon carbide doghouse (100); and
 a first isopipe (102) situated within, e.g., encompassed by at least a portion of, the first enclosure,
the first enclosure includes a plurality of first heating element assemblies integral with the exterior wall of the first enclosure (103), and the at least one first heating element is in proximity to a portion of molten glass stream overflowing the first isopipe within the enclosure.

In embodiments, the each of the heating element assemblies can be, for example, at least one wire winding support having a plurality of vias, i.e., grooves, or like structures, and having a plurality of resistive wires interleaved on the plurality of vias of the at least one wire winding support.

In embodiments, the at least one wire winding support can be, for example, a wire winding support situated on one or both of two opposing sides of the first enclosure.

In embodiments, the at least one winding support can be, for example, a plurality of winding supports situated on the opposing sides of the first enclosure.

In embodiments, the at least one wire winding support can be, for example, a plurality of wire winding supports situated on the same side of the first enclosure and a plurality of wire winding supports on the opposite side of the first enclosure.

In embodiments, the at least one wire winding support can be, for example, a plurality of wire winding supports situated on the same side of the first enclosure and a plurality of wire winding supports on the opposite side of the first enclosure, and the plurality of wire winding supports are situated at a first elevation on the enclosure; at a second elevation on the enclosure; a third elevation on the enclosure, or a combination of two or more of the elevations.

In embodiments, the apparatus can further include, for example, a second enclosure, the second enclosure, i.e., a muffle, that encloses at least a portion of the first enclosure.

In embodiments, the apparatus can further include, for example, a second isopipe situated above and vertically aligned with the first isopipe within the first enclosure.

In embodiments, the apparatus can further include, for example, at least one second heating element assembly integral with the exterior wall of the first enclosure comprising a second array of heating elements situated in proximity to a portion of molten glass stream over-flowing the first isopipe, the second isopipe, or in between the first isopipe and the second isopipe, or a combination thereof, within the enclosure.

In embodiments, the plurality of first heating element assemblies integral with the exterior wall of the first enclosure can be, for example, from 2 to about 200 assemblies.

In embodiments, the disclosure provides a laminate fusion apparatus for thermal profile control of a molten glass stream, comprising:
 a first enclosure, e.g., a silicon carbide doghouse;
 a second enclosure, e.g., muffle, encompassing at least a portion of the first enclosure; and
 a first isopipe and a second isopipe situated within the first enclosure,
the first enclosure includes a plurality of heating element assemblies integral with the exterior wall of the first enclosure, the heating element assemblies comprise a plurality of wire winding supports having vias, the vias having resistive wire windings, the wire windings being configured to controllably receive energy from an electrical source and dissipate heat into the first enclosure.

In embodiments, the disclosure provides a method of using the above described and illustrated apparatus, the method comprising:
 heating the apparatus to thermal equilibrium with the plurality of first heating element assemblies;
 charging the apparatus with molten glass from a glass source; and
 monitoring at least one of: the temperature profile of the molten glass stream; the power level profile to the plurality of first heating element assemblies to maintain the apparatus in thermal equilibrium; the thickness profile of the glass ribbon formed in the apparatus, or a combination thereof.

In embodiments, the thickness profile of the glass ribbon controllably formed in the apparatus can be, for example, uniform, non-uniform, or combinations thereof.

In embodiments, the thickness profile of the glass ribbon formed in the apparatus can be, for example, at least one of vertically linear, horizontally linear, a concave parabolic, a convex parabolic, or a combination thereof.

In embodiments, the method can further include, for example, maintaining at least one of: the temperature profile of the molten glass stream overflowing the isopipe(s); the power level to the plurality of first heating element assemblies to maintain the apparatus in thermal equilibrium; the thickness of the glass ribbon formed in the apparatus, or a combination thereof, wherein the thickness of the glass ribbon formed in the apparatus can be, for example, uniform, non-uniform, or combinations thereof, to achieve a desired glass ribbon thickness profile.

In embodiments, the method can further include, for example, independently or coordinatively controlling the power level to the wall-embedded first heating elements situated on opposite sides of the apparatus; independently or coordinatively controlling the power level to the wall embedded second heating elements situated on opposite sides of the apparatus; independently or coordinatively controlling the power level to the wall embedded third heating elements situated on opposite sides of the apparatus; and like alternative or additional power level controls, or combinations thereof.

In embodiments, the present disclosure provides a fusion draw apparatus or a laminate fusion draw apparatus having, for example, heating elements embedded in the walls of the enclosure (e.g., silicon carbide doghouse) at intervals laterally along, for example, each side of the trough of the upper pipe; the root of the bottom pipe; the region or gap between the pipes; or combinations thereof. Heating elements can be comprised of, for example, a plurality of modular wire windings situated on each side (i.e., opposite sides) of the doghouse that can be independently controlled to control the temperature profile of the targeted glass flow(s) within the enclosure. The windings can provide a narrower, better defined thermal profile or signature, and the windings can be used to achieve a superior temperature profile of the individual glass layers. The disclosed apparatus and method can be a supplement or superior substitute for the globar heating method used in traditional standard draw fusion, but with significantly improved thermal control capability. In particular, the disclosed apparatus and method permit, for example, achieving uniform glass mass flow over the quality area of a fusion pipe, achieving stable and uniform confluence of glass streams at the region or gap between vertically adjacent pipes, and can aid achieving desired temperature distributions or profiles along the root of the isopipe.

In embodiments, the disclosure provides a laminate fusion draw apparatus, comprising:
 a heated tiltable enclosure surrounding at least a portion of an upper isopipe, a lower isopipe, or both isopipes;
 a fixed muffle enclosure surrounding at least a portion of the heated tiltable enclosure; and
 a non-contact temperature sensing system for determining, and either adjusting or maintaining at least one temperature gradient of the heated tiltable enclosure.

In embodiments, the non-contact temperature sensing system can include, for example:
 an n×3 sensor array, where n is, for example, from 1 to 40;
 a multiplexer and a digital acquisition unit that receives and processes at least one signal from the sensor array; and
 a programmable controller that that receives and processes at least one signal from the multiplexer and a digital acquisition unit, for example, a single digital acquisition unit head, such as a photrix head (preferred for cost and accuracy considerations), and where if the system determines an anisothermal (i.e., not isothermal) condition then the programmable controller generates a temperature adjustment signal, and transmits the signal to a heater of the heated tiltable enclosure to approximate an isothermal temperature profile of the glass in the vicinity of the clad isopipe.

In embodiments, the apparatus can further include, for example, a server including a database and data analysis module.

In embodiments, the non-contact temperature sensing system can have, for example, an accuracy of plus or minus 0.25% or about plus or minus 2.5° C. at 1,200° C. Other available temperature sensing methodologies, such as metal thermocouples or FLIR, have issues or limitations which prohibit their use is the disclosed apparatus and method of making laminate glass. The FLIR has an accuracy of only about plus or minus 2% or about plus or minus 25° C. at 1,200° C., and is inadequate for achieving glass laminate dimensions of the present disclosure. The metal thermocouples possess adequate accuracy but have logistical issues that include complications of having to pass through the walls of the heated tiltable enclosure.

In embodiments, the disclosure provides a method of manufacturing a laminated glass article, comprising:
  forming a laminated glass article in a fusion draw apparatus, the apparatus comprising:
    a heated tiltable enclosure surrounding an upper isopipe and a lower isopipe;
    a fixed muffle enclosure surrounding at least a portion of the tiltable enclosure; and
    a non-contact temperature sensing system for determining, and adjusting or maintaining at least one temperature gradient of the heated tiltable enclosure while the apparatus is in use drawing and laminating glass, i.e., the work piece;
  determining the at least one temperature gradient; and
  if the at least one temperature gradient is not isothermal, i.e., anisothermal, then adjusting the at least one temperature gradient of the tiltable enclosure, or
  if the at least one temperature gradient is isothermal then maintaining the at least one temperature gradient of the tiltable enclosure as isothermal, i.e., control at least one temperature gradient of the tiltable enclosure to approximate an isothermal condition of at least the glass draw in the upper isopipe.

In embodiments, the resulting laminate glass article drawn under isothermal conditions in above described apparatus can have, for example:
  a clad layer thickness of from 5 to 300 micrometers, such as from about 25 to about 60 micrometers, and a thickness variation of about plus or minus 2% or about plus or minus 1 to 2 micrometers,
and
  a core layer thickness of from 50 to 2,700 micrometers, such as from about 50 to about 1,200 micrometers, and a thickness variation of about plus or minus 2% or about plus or minus 1 to 2 micrometers.

In embodiments, the laminated glass article can be, for example, at least one borosilicate, or like or unlike glass compositions.

In embodiments, if the temperature of the tiltable enclosure can be, for example, maintained at or near an isothermal condition then the resulting laminated glass article has a clad layer and a core layer each having a uniform thickness.

Presuming the isothermal condition, one can achieve targeted thicknesses as follows: Glass on the clad pipe (weir) is heated and monitored until an isothermal condition is achieved and maintained. Molten glass flows over the clad pipe. The geometries of the clad pipe and the core pipe are fully symmetrical and the clad pipe and the core pipes are aligned with a central gravity vector. The isothermal conditions and full temperature symmetricity, in addition to the geometrical symmetry, assures an even overflow of molten glass on the left and right sides along each respective flow side of each pipe. The temperature sensing system including, for example, the light pipes, can be configured to control the temperature distribution of the respective molten glass flows of each pipe. The targeted thickness can be achieved by, for example, molten glass overflow ratios between clad and core (e.g., 1:6, meaning that total clad thickness is 1× compared to a total core thickness of 6×, and the left clad is equal to 0.5× and right clad is equal 0.5×.

If the above conditions are satisfied, then the core and clad viscous glass after fusion at the root of the core pipe can be vertically drawn by pulling rolls (at the edges) at a linear vertical speed that ensures "stretch" of the ribbon to the prescribed thickness values, for example, as mentioned above. The thickness uniformity can be further manipulated or controlled by having, for example: electrical windings (or similar technology) being placed on the doghouse, see FIGS. 1A and 1B (elements 110a, 110b, 110c), and FIG. 2; electrical windings (or similar technology) being placed on the isopipes; or a system of positive air pressure pipes (see for example, as described by Dockerty in U.S. Pat. No. 3,338, 696).

In embodiments, the resulting laminate glass article drawn under isothermal conditions can be, for example, substantially free of warp, is a substrate suitable for use in a thin film transistor (TFT) device, or both. In embodiments, "substantially free of warp" refers to, for example, from about 95 to 100% free of warp, from about 96 to 99.5% free of warp, from about 97 to 99.0% free of warp, and like values and ranges.

In embodiments, the disclosure provides a method of making a laminated glass article, comprising:
  forming a laminated glass article in a fusion draw apparatus, comprising:
    a tiltable enclosure surrounding an upper isopipe and a lower isopipe;
    a fixed muffle enclosure surrounding at least a portion of the tiltable enclosure; and
    a proximity sensing system for determining and adjusting the distance between the fixed muffle enclosure and the tiltable enclosure;
and
  determining and adjusting the distance between the fixed muffle enclosure and the tiltable enclosure to control the temperature gradients in tiltable enclosure and the glass draw in the upper isopipe.

The determining and adjusting the distance between the fixed muffle enclosure and the tiltable enclosure can include, for example:
  determining with at least one proximity sensor in the proximity sensing system the respective spatial locations of the fixed muffle enclosure and the tiltable enclosure, and calculating with a processor in the proximity sensing system the difference between the respective spatial locations of the enclosures to provide the distance between the fixed muffle enclosure and the tiltable enclosure; and
  adjusting the distance between the fixed muffle enclosure and the tiltable enclosure, the adjusting can include, for example:
  comparing the calculated distance with a reference distance between the respective spatial locations of the fixed muffle enclosure and the tiltable enclosure, and the calculated distance and a reference distance each correspond to a pre-determined gradient, and changing the spatial location of the tiltable enclosure to achieve a pre-determined or target temperature gradient, such as an isothermal condition.

In embodiments, the determining and adjusting the distance between the fixed muffle enclosure and the tiltable enclosure can be accomplished, for example, continuously or discontinuously.

In embodiments, the determining and adjusting the distance between the fixed muffle enclosure and the tiltable enclosure can be accomplished, for example, before, during, after, or a combination thereof, the draw.

In embodiments, adjusting the distance between the fixed muffle enclosure and the tiltable enclosure can include, for example, tilting the tiltable enclosure to a position or spatial location corresponding to a predetermined temperature gradient. In embodiments, the adjusting can be accomplished, for example, manually or robotically.

The tiltable enclosure and the upper isopipe can be cooperatively tiltable during the operation of the fusion draw apparatus, for example, tilting the tiltable enclosure can simultaneously tilt a mechanically coupled upper isopipe.

The controlling of the temperature gradients comprises, for example, minimize temperature gradients, maximize temperature gradients, stabilized temperature gradients, adjusting proximity or temperature to achieve desired or predetermined temperature gradients; or combination thereof.

The proximity sensing system for determining and adjusting the distance between the fixed muffle enclosure and the tiltable enclosure can include, for example:

at least one non-contact, high temperature stable sensor to measure the temperature gradient or gradients in the tiltable enclosure in proximity to the upper isopipe;

at least one proximity sensor to measure the distance between the fixed muffle enclosure and the tiltable enclosure; and a mechanism to adjust the distance between the fixed muffle enclosure and the tiltable enclosure based on the measured temperature gradient to achieve a predetermined temperature gradient, i.e., a target temperature gradient.

The at least one non-contact, high temperature stable sensor can be, for example, a sapphire light pipe.

The measured temperature gradient(s) of the enclosure can be correlated to actual temperature gradients of the clad glass.

In embodiments, the disclosure provides a laminate fusion draw apparatus, comprising:

a tiltable enclosure surrounding at least a portion of an upper isopipe and optionally a lower isopipe;

a fixed muffle enclosure surrounding at least a portion of the tiltable enclosure; and a proximity sensing system for determining and adjusting the distance between the fixed muffle enclosure and the tiltable enclosure to obtain target temperature gradient conditions within the tiltable enclosure.

In embodiments, the disclosure provides a laminate fusion draw apparatus, comprising:

a tiltable enclosure surrounding an upper isopipe and a lower isopipe;

a fixed muffle enclosure surrounding at least a portion of the tiltable enclosure; and a proximity sensing system for determining and adjusting at least one of:

the distance between the fixed muffle enclosure and the tiltable enclosure to obtain a target temperature gradient condition on at least one glass stream within the tiltable enclosure;

the heating of the tiltable enclosure to obtain a target temperature gradient condition on at least one glass stream within the tiltable enclosure; or a combination thereof.

"Consisting essentially of" or "consisting of" in embodiments can refer to, for example:

a glass fusion apparatus for molten glass stream thermal profile control, having:

a first enclosure or housing; and at least one of a first upper isopipe, a second lower isopipe, or a combination thereof, situated within the first enclosure;

the first enclosure includes at least one of:

a plurality of first heating element assemblies integral with the exterior wall of the first enclosure, and at least one of the first heating elements is in proximity to a portion of molten glass stream over-flowing the weirs of the first isopipe within the enclosure;

a plurality of second heating element assemblies integral with the exterior wall of the first enclosure, and at least one of the second heating elements is in proximity to a portion of molten glass stream near the root of the first upper pipe and near the top of the second lower pipe within the enclosure;

a plurality of third heating element assemblies integral with the exterior wall of the first enclosure, and at least one of a plurality of the third heating element assemblies is in proximity to a portion of molten glass stream near the root of a lower pipe within the enclosure; and a controller for independent control of each heating element assembly in the at least one of the plurality of: the first heating element assemblies, the second heating element assemblies, the third heating element assemblies, or a combination thereof.

The article, and the method of using the apparatus of the disclosure can include the components or steps listed in the claim, plus other components or steps that do not materially affect the basic and novel properties of the compositions, articles, apparatus, or methods of making and use of the disclosure, such as a particular apparatus configuration, particular additives or ingredients, a particular agent, a particular structural material or component, a particular irradiation or temperature condition, or like structure, material, or process variable selected.

In embodiments, the disclosed apparatus and method are advantaged in several aspects, including, for example:

providing an ability to alter the glass flow thermal profile primarily in the horizontal direction;

independently controlling each of the heating elements (e.g., wire windings), that is, independent of all other heating elements;

the heating elements (e.g., wire windings) when embedded into the outer walls of the enclosure can be situated and regulated to thermally affect a narrow band of the glass stream(s) without making openings in the interior walls of the enclosure;

the method of controlling the thermal profile of the glass streams with a plurality of independently controllable heating elements is simpler, more thermally efficient, and more precise than using cooling methods as a temperature profiling medium or instrumentality, for example, it is simpler to install resistive heating elements (e.g., the disclosed supports having wire windings) than it is to install cooling devices in the muffle region (i.e., secondary enclosure) or in the doghouse enclosure; and the problem of condensation of glass volatiles can be minimized or eliminated when using the disclosed plurality of strategically placed resistive heating elements compared to using cooling methods to adjust thermal profiles within the enclosure of the apparatus.

In embodiments other advantages of having heating elements, such as a wire winding support having wire windings thereon or therein, and the heating elements being embedded in the walls of a surrounding enclosure along the weir of the fusion pipe, can include, for example, the ability to:

control the thermal profile of the glass overflow along the horizontal length or end-to-end of the fusion pipe;

alter the mass flow of glass over the quality area of a single fusion isopipe to control the thickness of the single glass layer as a supplement or an alternative to a traditional method (e.g., U.S. Pat. No. 3,338,696, to Dockerty);

alter glass mass flow of glass at the pipe ends relative to the center of the pipe, and preferentially the pipe inlet relative to the compression end to combat pipe sag or avoid pipe tilt; or independently alter the glass mass flow distribution that flows over either of the weirs of a fusion isopipe.

Having these disclosed capabilities and advantages permit the thickness of the three layers of a laminated glass sheet to be independently controlled.

In embodiments, other advantages of having the heating element assemblies including the wire windings, for example, along the gap between isopipes in a multi-layer or laminate fusion draw can include, for example:

the ability to achieve a desired temperature profile that can ensure a stable and uniform confluence of glass streams;

the apparatus and method can provide a uniform temperature at the bottom of the clad pipe and the top of the core pipe; and the apparatus and method can optionally provide a non-uniform temperature along the gap between pipes to compensate for the change in the drop distance if, for example, there is a need to tilt one or both pipes.

These abilities and capabilities can also be directly applied to laminates having greater than 3-layers using stacked multiple isopipes.

In embodiments, advantages of having heating element assemblies including the wire windings at the root level of fusion pipe can include, for example:

the ability to control the glass thermal profile at the root; and the end-to-center delta or horizontal delta (i.e., temperature difference) across one or more isopipes or the laminate draw can be independently controlled.

Referring to the Figures, FIGS. 1A and 1B show, respectively, in end view and in perspective view exemplary resistive heater locations in a doghouse enclosure. In FIGS. 1A and 1B the silicon carbide (SiC) enclosure (100) around the two-pipe system (102, 104), includes the winding supports (110a, 110b, 110c) at upper, middle, and lower locations and integral with or attached to the exterior wall (103) of the enclosure. In embodiments, selected locations of the winding supports can be, for example, at elevations at the top (110a, 110b) and the bottom (110b, 110c) of each pipe. The winding supports (110) can have, for example, grooves or vias for holding the wires, and can also have an optional outer cover (110bi) such as shown in FIG. 2. Reference line (105a) defines the center and wall structure lines (106, 107), respectively, define the left and right sides of the left-center-right spectrum of thermal control. Circles (108) represent supplemental or optional globar or like conventional heating elements.

FIG. 2 shows the FIG. 1B inset (120) having dovetail grooves (210) to retain the winding assembly (110b) in the silicon carbide wall (220).

FIG. 3 shows an exemplary end view portion of a doghouse enclosure (100) wall (220) having resistive heater wire (e.g., platinum) windings (310) within, for example, each of the individual vias (not shown). The doghouse wall winding support retainer consists of, for example, 45 degree dovetail grooving (210), top, bottom, or both, having dimensions that accommodate the increased expansion rate of an alundum backer (320) during heat up, and hold the winding supports (e.g., 110b) in place as it cools and contracts. The optional cover (110bi) shown in FIG. 2 is not shown in FIG. 3 for clarity.

Figure 4:
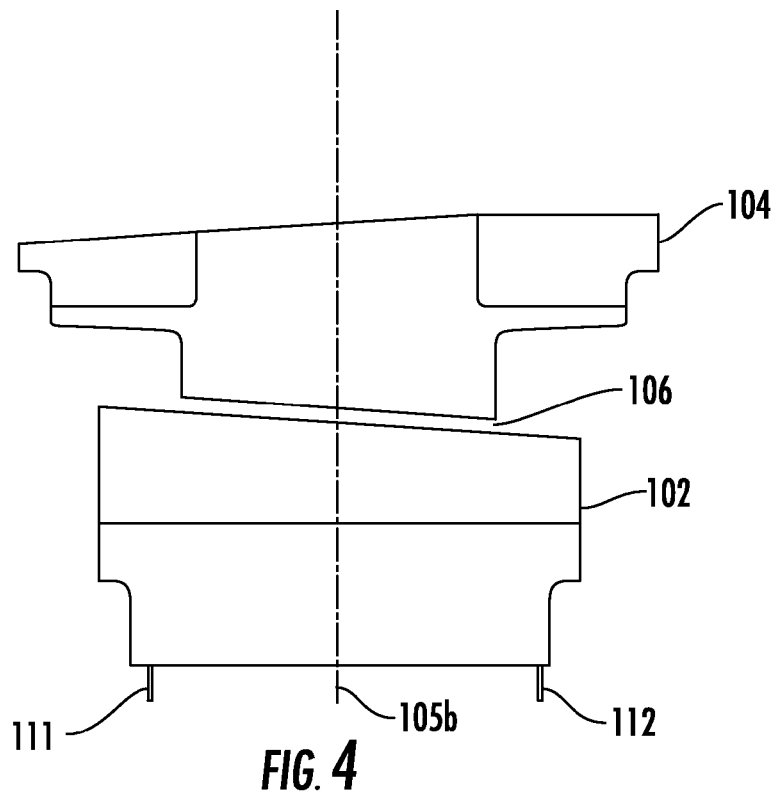
FIG. 4 shows a relative or nominal position of the two pipes: core (102) and clad (104) having a gap (106).

FIG. 4 shows a relative or nominal position of the two pipes: core (102) and clad (104) having a gap (106). Reference line (105b) defines the center and reference lines (111, 112), respectively, define the ends in the end-to-center-to-end spectrum of thermal control.

Figure 5:
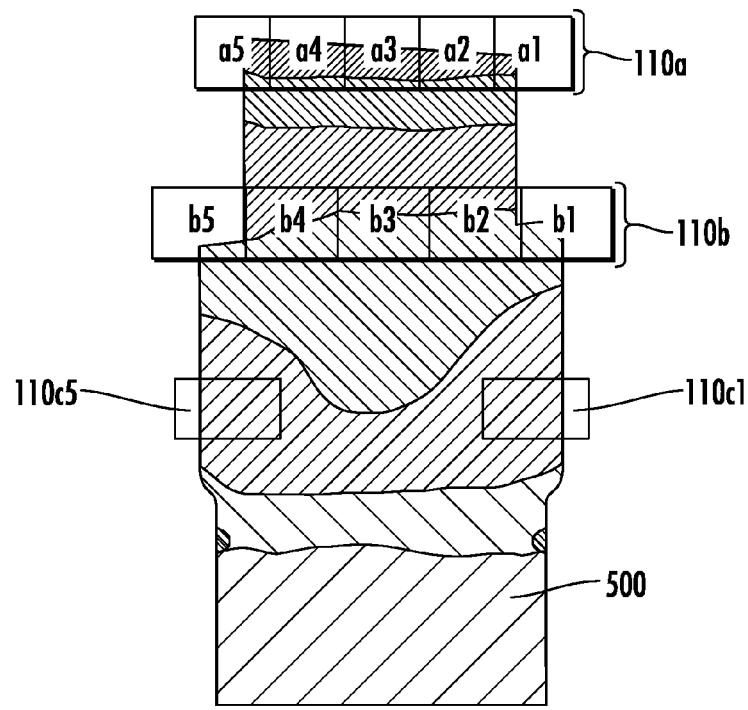
FIG. 5 schematically shows the winding supports in exemplary upper and middle arrays (110a1 to 110a5 and 110b1 to 110b5) and standalone lower array (110c1 and 110c5) relative to the vertically flowing and exiting glass sheet (500) in a laminate fusion draw machine.

FIG. 5 schematically shows the winding supports in exemplary arrays (top: 110a1 to a5, and middle 110b1 to b5) and standalone supports (bottom: 110c1 and 110c5) relative to the vertically flowing and exiting glass sheet (500) in a laminate fusion draw machine.

Figure 6:
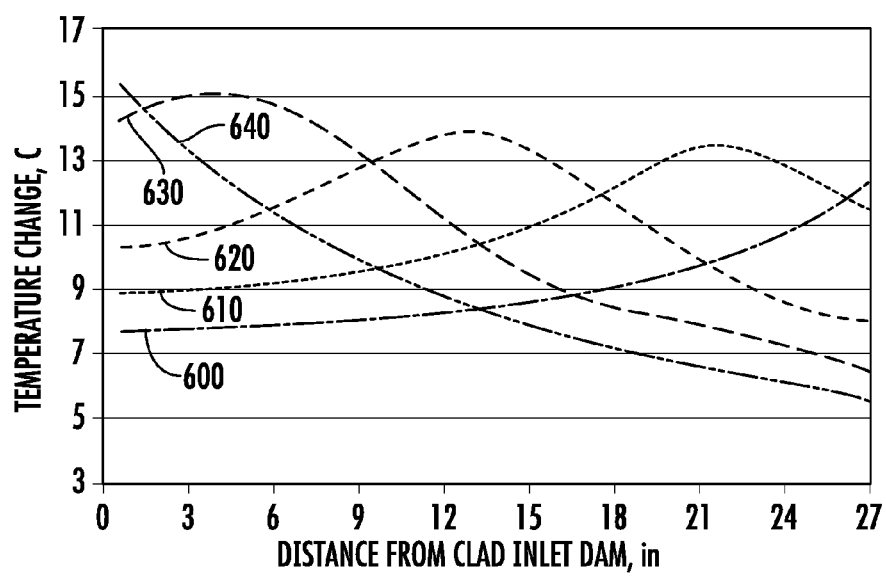
FIG. 6 shows exemplary thermal modeling results of wire winding efficiency.

FIG. 6 shows exemplary thermal modeling of wire winding efficiency. Temperature changes of the clad bottom region are shown that can result from, for example, 450 watts being added independently to each middle winding support of FIGS. 5 (110b1, b2, b3, b4, and b5), and as shown by the respective temperature change (%)(° C.) versus dam distances (inches) curves (600, 610, 620, 630, and 640).

Figure 7:
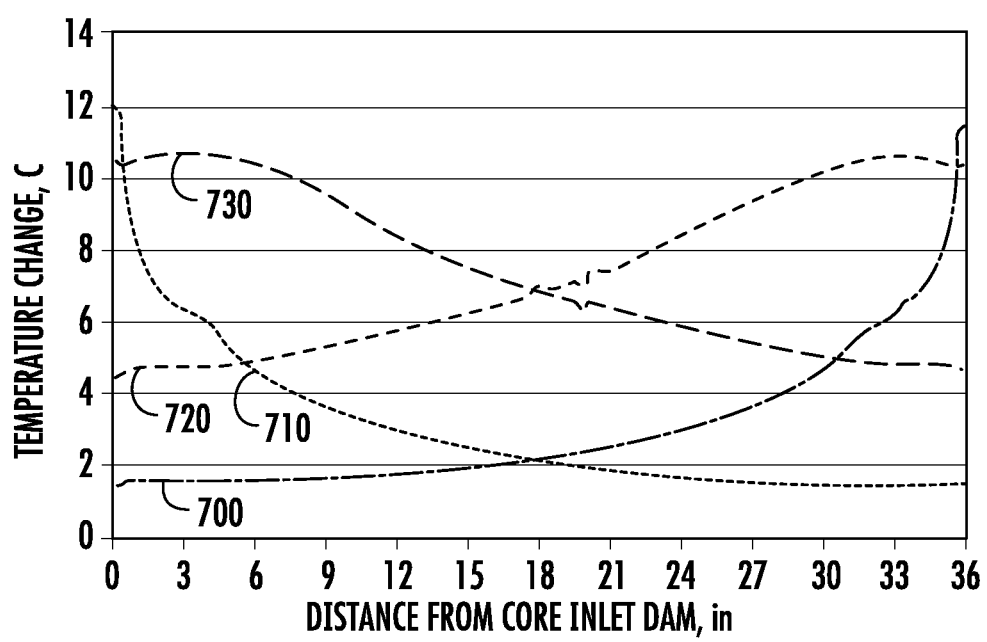
FIG. 7 shows the thermal response or temperature change from the inventive lower winding supports of FIG. 5 compared to a conventional transition upper inlet and compression windings located below the root and to the side of the fusion pipe.

FIG. 7 shows the thermal response or temperature change from the inventive lower winding supports of FIG. 5 (+400W)(110c1, 110c5) to the isopipe root temperature as shown by the respective temperature change versus dam distance curves (720 and 730) compared to the response for conventional transition upper inlet and compression windings (+300W) located below the root and to the side of the fusion pipe. The transition upper inlet (TUI; 710) and transition upper compression (TUC; 700) are heating wire windings of the prior art that are typically located below the root and behind their respective edge directors. Edge directors are disclosed in, for example, commonly owned and assigned U.S. Pat. Nos. 8,176,753, and 7,685,841.

Figure 8:
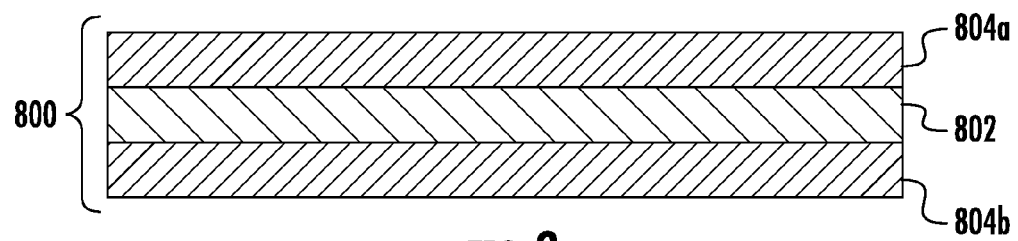
FIG. 8 shows a cross section of a laminated glass article.

FIG. 8 schematically shows a cross section of one embodiment of a laminated glass article. The laminated glass article generally comprises a glass core layer and at least one glass cladding layer fused to the glass core layer. FIG. 8 is a three layered laminated glass article. The laminated glass article (800) generally comprises a glass core layer (802) and at least one glass cladding layer (804). In the embodiment depicted in FIG. 8, the laminated glass article includes a pair of glass cladding layers (804a, 804b). The glass core layer (802) generally comprises two sides or surfaces, for example, a first face surface and a second face surface, which second face surface is opposite the first face surface. The glass cladding layers (804a and 804b), are fused to the glass core layer (802) without any additional materials, such as adhesives, coating layers, or the like, disposed between the glass core layer (802) and the glass cladding layers, (804a and 804b).

The disclosed laminate glass articles can have improved strength as a result of being laminated. In embodiments, the glass cladding layers (804a and 804b), of laminate (800) can be formed from a glass composition that has a lower average coefficient of thermal expansion (CTE) than the glass core layer (802). For example, when glass cladding layers formed from a glass composition having a relatively low average CTE are paired with a glass core layer formed from a glass composition having a higher average CTE during a lamination process, the difference in the CTEs of the glass core layer and the glass cladding layers results in the formation of a compressive stress in the glass cladding layers upon cooling. In laminated glass articles, such as laminated glass sheets, the surfaces of the article may be beneficially strengthened through compressive stresses created by, for example, a deliberate mismatch in coefficient of thermal expansion (CTE) between a core glass layer and cladding glass layer or layers of the laminated article.

The glass core layer (802) may be formed from a glass composition which has a high average CTE relative to the glass cladding layers (804a and 804b), to improve the strength of the laminated glass article.

In embodiments where the CTE of the glass cladding layers is lower than the CTE of the glass core layer, at least a portion of the glass core layer can be in tension, such as where the glass core layer has a region of central tension, as a result of the mismatched CTE values between the glass cladding layers and the glass core layer.

The laminated glass articles (800) may be formed by the fusion lamination process as described in commonly owned and assigned U.S. Pat. No. 3,338,696 (Dockerty); U.S. Pat. No. 4,214,886 (Shay); U.S. Pat. No. 7,748,236 (Pitbladdo); and U.S. Pat. No. 8,007,913 (Coppola).

Figure 9:
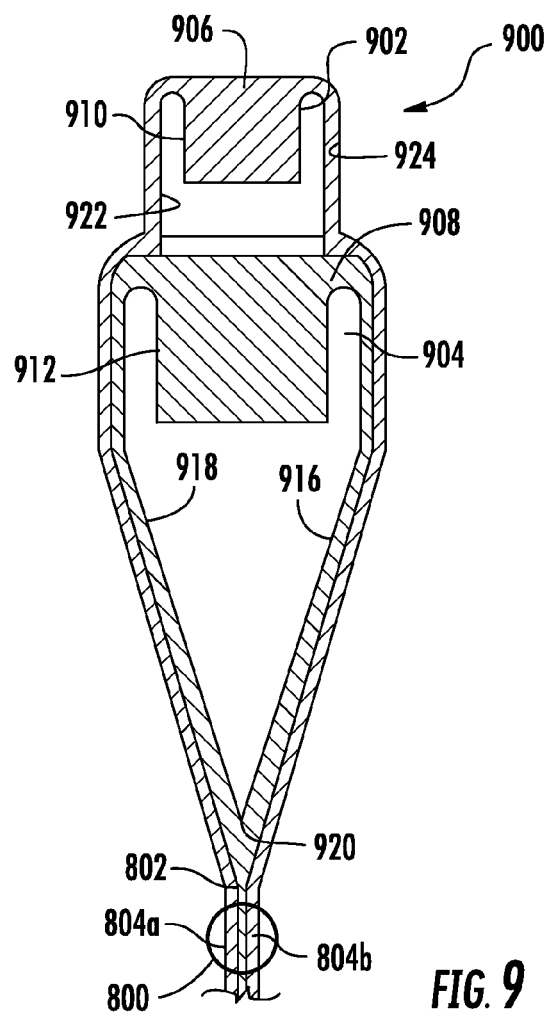
FIG. 9 shows a fusion draw apparatus and process for making the laminate glass article of FIG. 8.

FIG. 9 shows a laminate fusion draw apparatus (900) for forming a laminated glass article that includes an upper isopipe (902) that is positioned over a lower isopipe (904). The upper isopipe (902) includes a trough (910) into which a molten glass cladding composition (906) is fed from a melter (not shown). Similarly, the lower isopipe (904) includes a trough (912) into which a molten glass core composition (908) is fed from a melter (not shown).

In embodiments, as the molten glass core composition (908) fills the trough (912), the molten glass overflows the trough (912) and flows over the outer forming surfaces (916), and (918) of the lower isopipe (904). The outer forming surfaces (916 and 918) of the lower isopipe (904) converge at a root (920). Accordingly, the molten glass core composition (908) flowing over the outer forming surfaces, (916 and 918), rejoin at the root (920) of the lower isopipe (904) to form a glass core layer (802) of a laminated glass article. Simultaneously, the molten glass cladding composition (906) overflows the trough (910) formed in the upper isopipe (902) and flows over the outer forming surfaces (922, 924) of the upper isopipe (902). The molten glass cladding composition (906) is outwardly deflected by the upper isopipe (902) such that the molten glass cladding composition (906) flows around the lower isopipe (904) and contacts the molten glass core composition (908) flowing over the outer forming surfaces (916 and 918) of the lower isopipe, fusing to the molten glass core composition and forming glass cladding layers (804a and 804b) around the glass core layer (802).

In embodiments, the molten glass core composition (908) can have an average coefficient of thermal expansion $CTE_{core}$ which is greater than the average coefficient of thermal expansion $CTE_{clad}$ of the molten glass cladding composition (906). Accordingly, as the glass core layer (802) and the glass cladding layers (804a and 804b) cool, the difference in the average coefficients of thermal expansion of the glass core layer (802) and the glass cladding layers (804a and 804b) cause a compressive stresses to develop in the glass cladding layers (804a and 804b). The compressive stress increases the strength of the resulting laminated glass article without an ion-exchange treatment or thermal tempering treatment.

Once the glass cladding layers (804a and 804b) have been fused to the glass core layer (802) to form a laminated glass article (800), the laminated glass article may be shaped into a desired three-dimensional form, such as by vacuum molding or any other conventional glass shaping process. The laminated glass article (800) can be cut into its final shape by any conventional method. For example, the laminated glass article (800) may be cut by, for example, a laser or a blade. The cutting of the laminated glass article can cause an edge of the glass article to be exposed such that the glass core layer (802) is exposed on the edge and susceptible to damage.

In embodiments, the disclosure provides a method for precision manufacturing of a continuous or discontinuous laminated glass sheet in a laminate fusion draw machine. A proximity sensing system comprising a non-physical contact thermal metrology system measures the temperature gradients in the upper portion of the enclosure surrounding the fusion draw apparatus and correlates the measured temperature gradients of the enclosure with the actual and target temperature gradients or the temperature distribution of the clad glass within the enclosure. The proximity sensing system is a proxy (i.e., alternative or substitute) for the actual temperature gradients of the clad glass within the enclosure. The upper isopipe can be independently subjected to mechanical tilting during the operation of the laminate fusion draw machine. The enclosure can also be independently subjected to spatial adjustment with mechanical adjustment apparatus that are coordinated with the thermal metrology system. The thermal metrology system can be comprised of one or more non-contact, high temperature sensors (e.g., sapphire light pipes). The coordinated mechanical adjustment apparatus allows for adjusting or varying distance between the fixed structure of the muffle enclosure and the tilting enclosure that contains the clad isopipe, and can cooperatively move the tilting enclosure with the clad isopipe as a single or rigid body.

In embodiments, the disclosed method and apparatus provides an equivalent of an accurate temperature measurement of the clad glass during the viscous forming process, serving as a base for calculation of the gradients and monitoring the left-to-right (L-to-R) symmetry of the temperature gradients and the glass flow.

In a known apparatus and methods, the technologies used to analyze the temperature distribution of the enclosure for a single glass isopipe were comprised of fixed thermocouples, that were passed through the enclosure (doghouse) surrounding the clad isopipe to measure the air in the vicinity of the molten glass. This known procedure was acceptable since the doghouse enclosure did not move with respect to the muffle (i.e., a secondary enclosure). However, for manufacturing of laminate in the fusion process, the upper clad isopipe may need to move independently from the lower core isopipe, to enable geometrical alignment and to calibrate for a precise uniform flow rate on either side and across the entire optical quality width of the isopipe. Fixed thermocouples cannot accomplish this task because they originate from the exterior of the upper muffle structure, which does not follow the enclosure tilt.

In embodiments, the present disclosure provides high accuracy measurement of the thermal gradients on the surface of the enclosure in the vicinity of the clad isopipe, which can be operational while the enclosure is tilting relative to the muffle structure. In embodiments, the present disclosure can provide: continuous measurement of the temperature in the upper section of the doghouse, to deliver real-time feedback regarding the clad glass temperature distribution along the trough of the clad pipe; continuous measurement of the temperature on each side of the clad pipe to control the symmetry of glass viscosity distribution via glass temperature control; non-contact temperature measurement due to operational tilting of the enclosure (while the upper clad pipe does not follow the tilt); or the highest accuracy achievable, in the temperature range of, for example, 1050 to 1250° C. (depending on glass composition) to accurately measure small temperature gradients along the clad pipe, or combinations thereof.

Boro-silicate glasses, and other glass compositions, that can be subjected to the fusion draw process can be thermally measured and controlled in the same way.

In embodiments, the non-contact thermal sensors selected: do not require cooling; and can measure absolute temperatures as accurately as or better than Pt—Rh (platinum rhodium) thermocouples. Additionally, a digital acquisition (DAQ) architecture using, for example, symmetrically placed sensors, can provide relative temperature accuracy between the Left (L) and Right (R) sides of the clad isopipe to be within, for example, +/−1° C.

In embodiments, an array of nine (9) or N×3, where N is equal to 3, 4, or 5 IR light pipes was employed to accurately measure the surface temperature of the enclosure (doghouse) on the top and on the upper sides in the vicinity of the clad isopipe glass draw. A very high correlation (e.g., 95 to 99% or better confidence level) between the measured tillable enclosure temperatures and equivalent clad glass temperature predictions was obtained.

Since the clad glass temperature cannot be easily measured in the upper portions of the clad isopipe, the relevance of light pipe measurements can be judged by the results of a 3D thermal model which includes glass, doghouse, and the surrounding insulation. Comparison of model predictions at the light pipe locations with the predicted glass temperatures at the corresponding locations indicate that the difference is less than 2.5° C. The use of temperature measurements of the outside surface of doghouse instead of, or as a proxy for, the actual glass temperature entails a maximum error of +/−2.5° C. (i.e., the absolute temperature error at a temperature environment of about 1200° C.).

In embodiments, the light pipe arrays were disposed at several cross-sections of the enclosure for implementation with real time monitoring and control of the L vs. R flow of the clad molten glass over the weir. Such a setup can also measure the temperature gradient from the inlet to the compression in the upper portion of the weir of the clad pipe, which can be significant for precision forming of the clad glass over the core for uniform thickness distribution of the clad layers on the core layer (i.e., clad layers left-side and right-side; L vs. R).

In embodiments, the clad layer can have a thickness of from about 5 to 300 micrometers, from about 20 to 100 microns, such as 25 to about 60 micrometers, from about 30 to 90 microns, from about 40 to 80 microns, from about 45 to 70 microns, and from about 45 to 55 microns, including intermediate values and ranges. In embodiments, the clad layer can have a thickness variations of about plus or minus 2% or from about plus or minus 5 microns, 4 microns, 3 microns, 2 microns, and 1 micron, including intermediate values and ranges.

In embodiments, the core layer can have a thickness of from about 50 to 2,700 micrometers, such as from 50 to 1,200 micrometers, from about 50 to 1,000 microns, from about 55 to 950 microns, from about 60 to 850 microns, from about 75 to 750 microns, from about 90 to 700 microns, from about 100 to 650 microns, and from about 200 to 600 microns, including intermediate values and ranges. In embodiments, the core layer can have a thickness variations of about plus or minus 2% or about from about plus or minus 100 microns, 75 microns, 50 microns, 25 microns, and 10 microns, including intermediate values and ranges.

In embodiments, the core ribbon can have a width (left-to-right) of from about 10 to 200 centimeters, from about 20 to 175 centimeters, from about 60 to 150 centimeters, and from about 75 to 100 centimeters, including intermediate values and ranges.

In embodiments, the clad ribbon can have a width (left-to-right) of from about 10 to 200 centimeters, from about 20 to 175 centimeters, from about 60 to 150 centimeters, and from about 75 to 100 centimeters, including intermediate values and ranges.

In embodiments, the clad ribbon can have a width (left-to-right) that is greater than, less than, or comparable to the core ribbon width.

Figure 10:
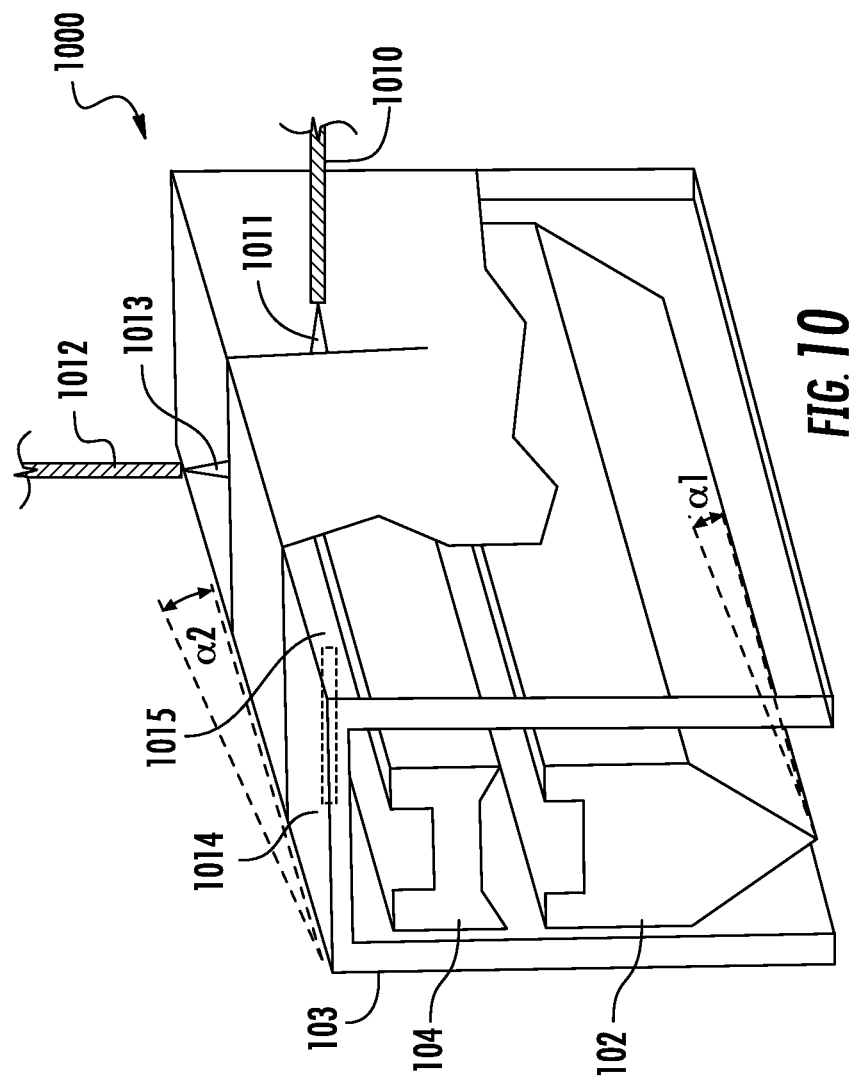
FIG. 10 shows an exemplary fusion draw apparatus having aspects of the temperature and proximity sensing systems.

FIG. 10 shows a perspective schematic of a two isopipe system (1000) enclosed by an enclosure (103) (doghouse). The doghouse enclosure can be made of silicon carbide (SiC), and has the clad (104) and the core (102) isopipes disposed inside. A cross section is shown for light pipe (1010, 1012, and 1014 (obscured)) locations with graphical representation of the field of view (FOV) or field of sensing for each light pipe. The light cones (1011, 1013, 1015 (obscured)) represent the FOV of the IR light pipes. When the lower (core) pipe tilts (i.e., angle $\alpha 1$), the entire doghouse tilts (i.e., angle $\alpha 2$). The temperature sensors cannot be easily welded to the enclosure or threaded through holes in the enclosure as air thermocouples. That is, during tilting of the core pipe by angle alpha (i.e., $\alpha 1$), the enclosure (doghouse) cooperatively also tilts as a single or coordinated rigid body by the same angle alpha (i.e., $\alpha 1$). An air thermocouple(s) that is led from exterior of the muffle cannot be inserted into the doghouse or welded to the doghouse because the doghouse of the upper clad isopipe tilts together with the lower isopipe, while the muffle, which can house both isopipes, is stationary. In embodiments, there can be two muffles: one for core isopipe, and one for clad isopipe. The two muffles can tilt independently. A single doghouse, which encloses both the upper and lower isopipes, can be supported by lower muffle, so that the doghouse and lower isopipe can tilt together.

Figure 11:
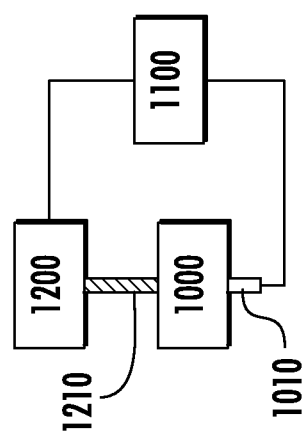
FIG. 11 is an exemplary block diagram of the proximity sensing system that can be used in conjunction with spatial adjustment and positioning of the disclosed fusion draw apparatus of FIG. 10.

FIG. 11 is an exemplary block diagram of a proximity sensing system of the disclosed fusion draw apparatus including, for example, a tiltable enclosure (1000), a temperature sensor (e.g., 1010) for sensing temperatures of the surface of the tiltable enclosure or alpha-adjustable enclosure. Each temperature sensor (1010) can be in communication with a processor (1100). The processor is in communication with an adjustment mechanism (1200), including, for example, a servomotor, or a motor and jack screw, or like sources of coordinative motive force, which mechanism is in contact with and acts on the tiltable enclosure (1000) based on instructions from the processor (1100).

The accuracy and spatial resolution of the temperature sensing system, the proximity sensing system, or the measurement or adjustment subsystems, can be executable in real time, and do not interfere with the viscous process (i.e., not cooled, and non-contact). Such apparatus or method can be implemented, for example, as a passive quantitative thermal field monitoring or as an active viscous process control tool to manage the clad glass viscosity distribution according to operational parameters.

Proximity and Distance Sensing

In embodiments, the proximity sensing system of the disclosed fusion draw apparatus can include, for example, a distance sensor in combination with the temperature sensor. The distance sensor can be, for example, a pulse-ranging-technology (PRT) sensor that can measure how far away objects are analogous to radar with the exception of using a light burst instead of a radio wave. A PRT sensor emits bursts of light that bounce off an object of interest and return to the sensor (e.g., lidar remote sensing). The sensor's processor clocks the light's time of flight (TOF) and calculates the distance to the object. The distance from the sensor to the object (S) is equal to the speed of light constant (c) multiplied by the time of flight of the pulse going from the sensor and returning to the sensor divided by 2 according to the equation: S=(c×TOF)/2. A variety of sensing and control products, such as proximity sensors, positioning systems including distance measuring devices, are commercially available from, for example, Pepperl-Fuchs (Twinsburg, Ohio).

To monitor absolute position of the enclosure, each axis of motion can include, for example, a potentiometer that can function as an absolute position sensor. Each axis of motion can also have an incremental magnetic encoder to track displacement from a set point or starting point, and the set point provides a reference for further spatial position adjustment or reset.

EXAMPLE(S)

The following examples serve to more fully describe the manner of using the above-described disclosure, and to further set forth best modes contemplated for carrying out various aspects of the disclosure. These examples do not limit the scope of this disclosure, but rather are presented for illustrative purposes. The working example(s) further describe(s) how to assemble and operate the disclosed apparatus.
Materials and Methods
Heating Element The present disclosure provides heating elements, including wire windings and supports for the wire windings, that can be, for example, about 1 inch and 8 inches wide and about 3 to 10 inches high, and like dimensions. The heating elements or heating units can be positioned at selected intervals along the horizontal length on the outer wall of the doghouse enclosure corresponding to the horizontal length and position of the fusion pipe within the doghouse. The heating elements can be positioned at selected intervals along the vertical dimension of the outer wall of the doghouse enclosure corresponding to thermally significant regions of the fusion pipe or associated glass streams within the doghouse. The wire windings can be made of, for example, platinum, or like metals or alloys for their ability to conduct heat. In embodiments, the platinum wire can be, for example, wrapped serpentine fashion around an alundum backer since the alundum expands at the same rate as platinum. In embodiments, the wire winding support design can include wire and the spacing between the wires that provides appropriate current densities to maximize heating efficiency and heating element lifetime(s), and minimize the risk of potential failure of the heating element.

Other additional or alternative heating elements can be considered. As an example, plate-type ceramic heating elements based on, for example, silicon nitride or silicon carbide material, can be utilized to increase power density, improve reliability, increase chemical durability, and minimize thermal expansion differences between the doghouse enclosure and the heating elements.
Winding Locations In an exemplary fusion unit, a series of wire windings and their associated winding supports can be located on each side of the fusion pipe at two elevations, such as the trough and the root.

In an exemplary three-laminate fusion draw unit, there can be three elevations: along the top of the weir of the clad pipe, at the bottom of the clad pipe (e.g., at the confluence of two glasses), and at the root of the core pipe. This embodiment is illustrated and demonstrated in FIG. 1. Referring to the Figures, FIGS. 1A and 1B display a single series or array of windings (e.g., 110b) situated across the bottom of the clad pipe and the top of the core pipe. If desired, these windings can alternatively be separated into two horizontal series, one for the bottom of the clad pipe and one for the top of the core pipe (not shown).

In embodiments, such as in a multi-laminate apparatus and method, an intermediate array or middle array of heat element wire windings can be situated between the stacked pair of fusion pipes.

Additionally or alternatively, these heating elements or wire winding modules or units can be, for example, embedded into the silicon carbide enclosure to bring the thermal conditioning as close to the glass as possible and to narrow the width of the thermal influence on the glass surface.
Doghouse Enclosure/Windings Construction The winding supports can be held in place by dovetail grooving of the silicon carbide wall of the doghouse enclosure, combined with beveling of the edges of the winding supports (FIG. 2). Since the alundum in the winding supports expands at a greater rate than the silicon carbide of the SiC enclosure, special design considerations can be made for their installation (FIG. 3). In embodiments, the doghouse enclosure wall is preferably wider than the alundum in a cooled state, and consequently will have a lip that holds the winding supports in place, yet have enough room for the heating element's expansion during heat up. Consequently, if ceramic winding supports are incorporated, which can have similar thermal expansions to SiC, the design can be further simplified.
Capability/Function
Trough Level:

With the use of the disclosed winding supports, a temperature profile can be achieved that produces a desired glass flow distribution, and a desired glass viscosity distribution, along the trough of the pipe. The heating from the windings can be used to adjust the glass distribution along the horizontal length of the clad weirs. By locally changing the temperature in the trough, along the weirs, or both, the thickness of the final glass sheet can be locally affected. Heating a narrow region decreases glass flow at that point and causes thinning at that section. Relative cooling of a narrow region (e.g., decreasing the winding power) increases flow at that point and causes thickening at that section.

Along the Gap Between Pipes:

In the nominal position, for example, at the gap (106), the angle of the bottom of the clad pipe (104) matches the angle of the top of the core pipe (102) (see FIG. 4). This provides a uniform drop distance from the clad root to the core weir, referred to here as the gap or "the slot" (106) between the two pipes. Because of the root and weir angle, one end of the slot can be higher than the other end. Therefore, one end of the slot will likely be at a temperature hotter or colder than the other end. This can cause an undesirable viscosity gradient along the length of the slot. The velocity of glass flow is a function of flow rate, viscosity, and drop distance. Thus, a viscosity gradient can cause a velocity gradient in the glass that can potentially create flow instability. This can manifest itself in stretching of the glass, causing non-uniform flow over the weirs of the core pipe or piling of the clad glass onto the core glass, generating so-called seeds and blisters, and producing thickness variation.

In embodiments, the resistive heating elements can be structurally or electrically modified to bring uniformity to the temperature along the angled length of the slot.

Many of the foregoing issues can also occur when the angle of one or both of the two pipes is changed (e.g., tilting of one or both pipes) to correct glass distribution. Tilting can cause a variable gap in the slot, thus affecting the velocity of the clad glass flow onto the core glass flow. Through the use of the disclosed apparatus and method, the heating elements and their respective heating of the contents of the doghouse can be independently adjusted to control the glass viscosity at the root of the upper pipe. The glass viscosity can be modified so that the velocity of glass flow is uniform along the horizontal length (i.e., left-center-right dimension) of the slot.

FIG. 5 shows winding support locations relative to the glass in an embodiment of the disclosure.

FIG. 6 illustrates an exemplary computer simulation of the efficiency of middle zone (110b) windings. The simulation gives glass temperature change of the clad bottom as the result of 450 watts being added independently to each middle winding. Such thermal responses can noticeably enhance the ability to achieve the desired temperature profile of the clad glass flow landing on the core glass between the isopipes.

At the Root Level:

In a traditional fusion draw apparatus and process, a profiled globar can be primarily used to achieve a desired temperature profile. The globar can define simultaneously the center temperature of the glass at the root, the center-to-ends delta (i.e., the temperature difference between the pipe end and the pipe center), and the particular shape of the profile. Root level heating elements of the disclosure can further improve the heating flexibility to achieve a desired root temperature profile.

FIG. 7 illustrates the difference between thermal response to conventional transition upper windings and the disclosure's windings. Although not limited by theory, it is believed that a set of the disclosed heating elements such as the disclosed modular wire windings, can permit using a non-profiled globar, then independently controlling the end-to-center delta or temperature differential for each end and the center root temperature. This modification allows running various glass compositions and combinations using the same equipment and still achieve the required temperature profile.

Tilt Adjustable Doghouse Enclosure and Tilt Adjustable Isopipe

To achieve desired mechanical properties of the laminate glass product, such as warp-free shape and uniform thickness of each (L and R) clad layer across the optical quality range, the delivery of the molten glass to the confluence area and along both pipes must be within a relatively narrow viscosity range. This is because viscosity differences at the confluence area result in velocity differences that cause local flow instability or an uneven thickness distribution, irrespective of CTE (Coefficient of Thermal Expansion) in the final laminate sheet.

The disclosed tilt adjustable doghouse enclosure and tilt adjustable isopipe having an indirect non-contact, accurate measurement of the clad glass temperature inside the muffle enclosure provides superior temperature measurement and temperature gradient information compared to conventional thermal couple based measurements. Specifically, modeling predictions show that the clad glass trough temperature for a composition pairing is from about 1153° C. to about 1156° C., and the top of the doghouse is from about 1156° C. to 1159° C. The correlation between the two predicted curves (plotted data not included) R2 (top location) is equal to 0.992. Another location on the side of the clad pipe (below the weir) exhibits temperatures from about 1157° C. to 1162° C. The outer surface of the doghouse at the same height and location is represented by temperatures from about 1157 to 1161° C. The correlation factor between the two curves (plotted data not included) R2 (side location) is equal to 0.997. These two examples show a very high correlation between the predicted or modeled temperatures of the clad glass and equivalent or actually measured proximal temperatures on the doghouse. Accordingly, the outer doghouse temperature measurements of the disclosed method and apparatus can be very representative of the clad glass being drawn.

To interrogate the temperature profiles, it is desirable to provide an array of sensors, such as light pipes in at least a 3×3 array. Other sensor arrays can be, for example, 4×3, 5×3, and like sensor arrays. The final sensor array architecture can be suggested or modified by specific process requirements or apparatus limitations. A significant physical constraint is the access to the doghouse.

By symmetrical positioning of the sensors of the array on both sides of the doghouse, an human operator or process controller can quantitatively monitor the symmetry of the temperature gradients on the left, right sides, or both sides of the doghouse, leading to an indirect indication of flow symmetry (i.e., via viscosity comparison on L vs. R). In embodiments, the symmetrical positioning of the sensors is a significant aspect of the disclosed method and apparatus in view of the stringent thickness symmetry requirements. Continuous thermal data leads to real-time monitoring of the clad glass temperature distribution on the weir and in trough portions of the clad pipe.

The sensor is preferably a non-contact type where, for example, the tips of sensor, such as a light pipe "sees" only a very small cone that is approximately 15 degrees of the Field of View (FOV). Suitable sensors, such as sapphire IR light pipes, are commercially available from LumaSense Technologies, Inc. (Santa Clara, Calif.).

In embodiments, acquiring analog data obtained by the light pipes can be accomplished by, for example, coupling the sapphire rod with the pyrometer head. However, the top of the muffle enclosure is hot (e.g., greater than 120° C.), and positioning the pyrometer heads there would require an individual water-cooled jacket for each location. This cooling requirement could pose environmental issues and be a potential safety issue if, for example, the water-cooled jacket leaked coolant. To avoid these issues, the present disclosure provides a method and apparatus where the analog signal acquired and transmitted by the sensors (e.g., IR light pipes) is guided optically via a fiber-optic to a remote location having stable and low temperature (e.g., room temperature).

In embodiments, the individual sensor generated signals can then be multiplexed by, for example, an optical multiplexer (MUX) in serial fashion (i.e., one channel at a time), and the signals can be conditioned and evaluated by a single optical pyrometer head. This multiplexing approach improves the accuracy of the measured temperature differences. The process is most sensitive to the temperature differences between individual channels when a single detector is used to measure all channels, for example, 9 (3×3), 12 (4×3), 15 (5×3), or like channel groupings.

In embodiments, a suitable DAQ scheme can include, for example: a plurality of probes or non-contact sensors, such as two or more light pipes (e.g., three light pipes; one on top and two on opposite sides) within the muffle enclosure and strategically disposed around the exterior of the doghouse enclosure; a multiplexer in signal communication with the probes, such as by a fiber optic or like connection; a DAQ unit in signal communication with the multiplexer; a programmable controller, for de-multiplexing and control, in upstream signal communication with the multiplexer and DAQ, such as by a RS232 or wireless link; and optionally a server in upstream signal communication with the programmable controller for, for example, remote access, operational control, communications, recording, and like operations or functions. Based on the temperature sensor data and previously determined desired temperature gradient profiles, the programmable controller can control, for example, one or more spatial adjustments of the doghouse enclosure with respect to the clad pipe to favorably alter the temperature gradient to a desired or target temperature gradient profile.

In embodiments, the accuracy of the temperature measurement (e.g., +/−0.15%*T from the light pipe sensors, and an additional +/−0.10%*T from the multiplexer) matches or exceeds the accuracy of the best high temperature thermocouples characterized by, for example, +/−0.25%*T (the absolute measured temperature value) at the temperatures exceeding 1,000° C. (per manufacturer specs). The accuracy of the temperature measurement can be especially significant for thermal analysis of the clad glass on L vs R sides of the pipe below the weir.

In embodiments, the present disclosure provides a fusion draw apparatus or a laminate fusion draw apparatus having a plurality of heating elements embedded in the walls of the enclosure (e.g., silicon carbide doghouse) at intervals laterally along, for example, in a laminate fusion draw apparatus on each side of the trough of an upper pipe; the root of a bottom pipe; the region or gap between the pipes; and like positions, or combinations thereof.

In embodiments, the apparatus and method can use the disclosed proximity or temperature sensing system alone or in combination with the aforementioned laminate fusion draw apparatus having a plurality of heating elements embedded in the walls of the enclosure to provide improved control of the thermal profile and properties of the clad molten glass stream. The proximity or temperature sensing system can detect, for example, a deviation or an excursion in the thermal profile of the clad glass pipe or stream. This deviation or excursion can lead to undesirable variation in clad layer thicknesses in the laminate product. The proximity or temperature sensing system can adjust the laminate fusion draw process by adjusting the proximity or temperature of the enclosure and thus the heating or thermal profile with respect to the clad glass pipe or stream. Alternatively or additionally, the proximity or temperature sensing system can adjust the laminate fusion draw process by selectively adjusting the temperature or thermal profile of the doghouse enclosure by changing the heating characteristics of one or more of the heating elements embedded in the walls of the enclosure to approximate or match a predetermined temperature gradient or thermal profile.

The disclosure has been described with reference to various specific embodiments and techniques. However, it should be understood that many variations and modifications are possible while remaining within the scope of the disclosure.

What is claimed is:

1. A laminate glass fusion draw apparatus for molten glass stream thermal profile control, comprising:
   a first enclosure;
   a second enclosure that encloses at least a portion of the first enclosure; and
   a first isopipe and a second isopipe situated within the first enclosure,
the first enclosure includes:
   a plurality of first heating element assemblies embedded in the exterior wall of the first enclosure, where at least one of the first heating element assemblies is in proximity to a portion of a molten glass product stream over-flowing the first isopipe within the first enclosure, and the plurality of first heating element assemblies control a portion of the thermal profile of the molten glass stream; and
   a plurality of second heating element assemblies embedded in an exterior wall of the first enclosure, where at least one of the second heating element assemblies is in proximity to a portion of molten glass stream near the root of the first isopipe and near the top of the second isopipe within the first enclosure,
wherein the plurality of the first and second heating element assemblies are slidably fitted into slots on the exterior of the first enclosure and are connected to a source of electricity to receive electrical energy and to controllably dissipate heat into the first enclosure, the first and second heating element assemblies each comprise at least one wire winding support having a plurality of horizontal vias and having a plurality of resistive wires horizontally interleaved on the plurality of horizontal vias of the support.

2. The apparatus of claim 1 wherein the first heating element assemblies comprise at least one of:
   at least one wire winding support situated on each of two opposing sides of the first enclosure;
   at least one wire winding support situated directly opposite on two opposing sides of the first enclosure; and
   a plurality of wire winding supports situated on the same side of the first enclosure at a first elevation and a plurality of wire winding supports situated on the opposite side of the first enclosure at the first elevation.

3. The apparatus of claim 1 wherein the first heating element assemblies comprise a plurality of wire winding supports situated on the same side of the first enclosure and a plurality of wire winding supports situated on the opposite side of the first enclosure, and the plurality of wire winding supports are situated at a first elevation on the enclosure; at a second elevation on the enclosure; at a third elevation on the enclosure, or a combination of two or more of the elevations.

4. The apparatus of claim 1 wherein the first isopipe is situated above and vertically aligned with the second isopipe.

5. The apparatus of claim 1 further comprising at least one globar heating element situated in a cavity between the first enclosure and the second enclosure.

6. The apparatus of claim 1 further comprising third heating element assemblies embedded in and slidably engaging the exterior wall of the first enclosure, situated on opposite sides of the apparatus, and in proximity to a portion of the molten glass stream near the root of a second isopipe within the first enclosure.

* * * * *